July 23, 1957 M. H. HUNT 2,800,263
FISH STRINGER HOLDER
Filed July 8, 1955
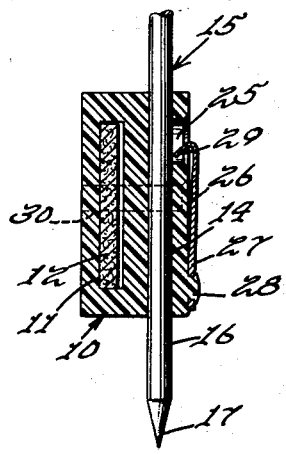
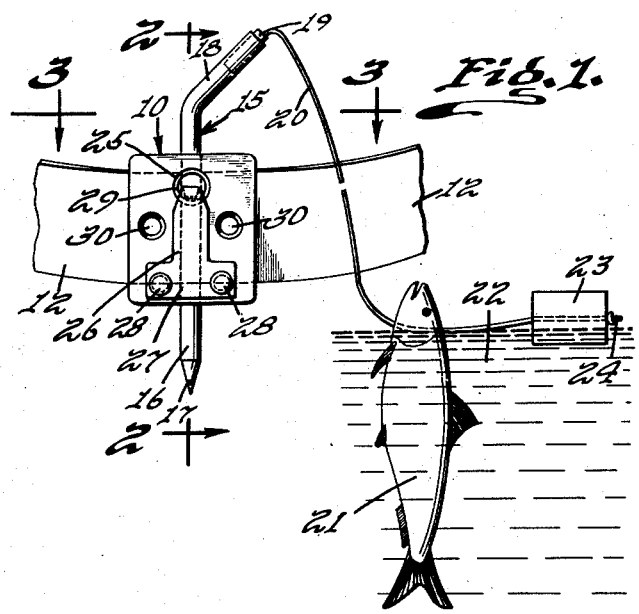
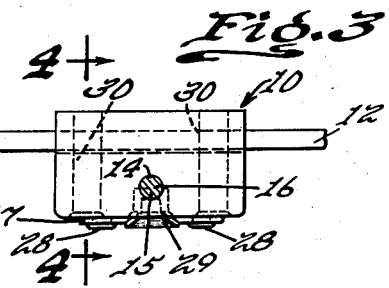
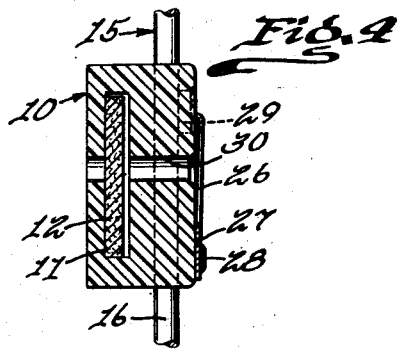
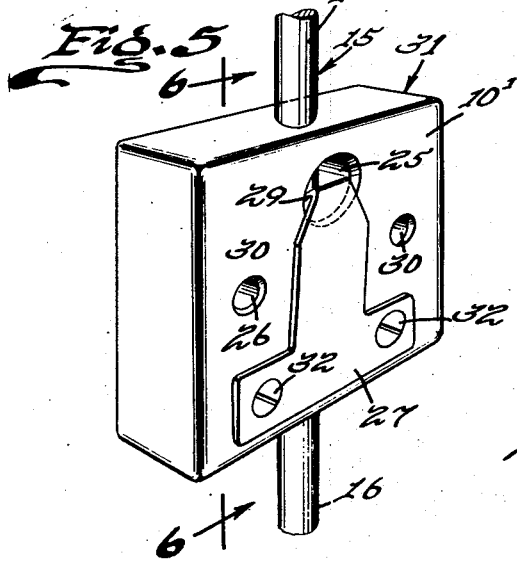
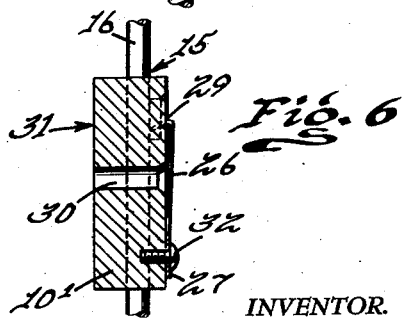
INVENTOR.
Marie Helen Hunt
BY Victor J. Evans & Co.
ATTORNEYS

United States Patent Office 2,800,263
Patented July 23, 1957

2,800,263

FISH STRINGER HOLDER

Marie Helen Hunt, Corpus Christi, Tex.

Application July 8, 1955, Serial No. 520,666

3 Claims. (Cl. 224—7)

This invention relates to fishing equipment, and more particularly to a holder for a string of fish.

The object of the invention is to provide a holder which is adapted to be attached to a fisherman's belt or secured to a pier, boat or other supporting structure, whereby a string of fish can be conveniently supported.

Another object of the invention is to provide a holder or support for a string of fish whereby the fish can be readily mounted on the holder, and whereby the placement of the fish thereon can be readily accomplished with one hand.

Another object of the invention is to provide a holder for a string of fish which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view illustrating a fish string holder of the present invention, showing a fish on the line and showing the device mounted on a portion of a fisherman's belt.

Figure 2 is a sectional view taken on the line 2—2 of Figure 1.

Figure 3 is a sectional view taken on the line 3—3 of Figure 1.

Figure 4 is a sectional view taken on the line 4—4 of Figure 3.

Figure 5 is a perspective view illustrating a modified holder.

Figure 6 is a sectional view taken on the line 6—6 of Figure 5.

Referring in detail to the drawings, the numeral 10 designates a body member which can be made of any suitable material such as plastic, and the body member 10 is provided with a slot 11 which is adapted to have extended therethrough a portion of a belt 12 which may be worn by a fisherman.

There is further provided in the body member 10 a vertically disposed bore 14, and a pin 15 includes a main cylindrical portion 16 which projects through the bore 14. The lower end of the pin 15 is pointed as at 17, while the upper portion of the pin 15 is arranged angularly as at 18. The angularly arranged portion 18 prevents the pin 15 from moving all the way down through the body member 10, and the angularly arranged portion 18 also defines a hand grip or handle. A plug 19 is mounted in the upper end of the pin 15, Figure 1, and a line or cord 20 extends from the plug 19. One or more fish 21 is mounted on the line 20, and the pointed end 17 of the pin 15 can be used to pierce the head of the fish so as to permit the line 20 to be drawn therethrough. The fish 21 may be arranged in the water 22, and a float 23 is connected to an end of the line 20, there being a knot 24 in the end of the line 20 for retaining the float 23 on the line.

There is further provided a cutout 25 in the body member 10 and the cutout 25 communicates with the upper portion of the bore 14. A clamp 26 includes a widened lower portion 27 which is secured to the body member 10 in any suitable manner, as for example by means of struck-out portions 28. Thus, the upper portion of the clamp 26 can flex outwardly slightly. An inwardly extending finger 29 projects from the top edge of the clamp 26 through the cutout 25, and the finger 29 frictionally engages the pin 15 for maintaining the pin 15 in the body member. There is further provided in the body member 10, a pair of spaced parallel openings 30, and these openings 30 may receive bolts, screws, or other securing elements. Thus, when desired, the belt 12 can be removed, and these securing elements can be extended through the openings 30 so as to fasten the body member 10 to a boat, pier, or other supporting structure.

Referring to Figures 5 and 6 of the drawings, there is shown a modified fish stringer holder which is indicated by the numeral 31, and the holder 31 has the same construction and function as the previously described holder of Figures 1–4, except that the body member 10′ of Figures 5 and 6 does not have a slot 11 for receiving a belt 12. Thus, the body member 10′ is adapted to be secured to a boat, pier, or other supporting structure by means of securing elements which may extend through the openings 30 therein. The body member 10′ may be made of metal instead of the previously described plastic. In Figures 5 and 6, the lower widened portion 27 of the clamp 26 may be secured to the body member 10′ by means of screws or bolts 32.

From the foregoing it is apparent that there has been provided a holder which is especially suitable for use in supporting a string of fish such as the fish 21. In use, a fisherman's belt 12 may be extended through the slot 11 in the body member 10 as shown in Figures 1–4. Then, the string of fish can be pulled along or moved along as the fisherman wades through the water or the like. As additional fish are caught, the pin 15 can be removed from the body member 10. Then, the sharp or pointed end 17 of the pin can be inserted through the head of the fish 21 so that additional fish can be strung on the line 2. Then, the pin 15 is grasped by the handle portion 18 and returned to its position in the bore 14 in the body member 10 after which the parts are maintained in their proper assembled position until additional fish are to be mounted on the line 20. Instead of arranging the body member 10 on the belt 12, the body member can be used without the belt, since screws, bolts or the like can be extended through the openings 30 for securing the body member to a supporting structure. In Figures 5 and 6 the body member 10′ is similar to the body member 10 except that no provision is made for a belt and the device is adapted to be secured to a supporting structure by securing elements which extend through the openings 30.

The outer portions of the openings 25 and 30 may be countersunk and the securing elements 28 may be formed integral with the body member 10. Thus, a hot iron can be used to form heads on the outer ends of the securing elements 28 and such heads may be similar to rivet heads. The pointed end 17 insures that the pin can be readily inserted through the jaw of the fish and also permits easy insertion of the pin into the body member. The clamp 26 maintains tension against the pin. The present invention only requires one hand to operate and as shown in Figures 1–4, the body member can be mounted on a fisherman's belt while wading, or else it can be put on a belt and strapped to the pier or piling or else it can be secured to a boat by securing elements passing through the openings 30. The form of the invention shown in Figures 5 and 6 can be permanently secured to a boat or other structure. In use, the clamp 26 is flexed outwardly if necessary to move the pin. When the pin 15 is removed, it is inserted through the fish jaw and then the fish slides down the stringer line 20 until the fish engages the cork float 23 and then the pin is reinserted in the bore 14. Since the slight pull by the fish is always downward, the device does not require a positive lock. The parts can be made of any suitable material such as a material which is not effected or corroded by salt water. The angular portion 18 provides a hand hold and prevents the pin from being pushed all the way through the body member. The length of the line 20 can be varied as desired.

I claim:

1. In a fish stringer holder, a body member provided with a horizontally disposed slot for the passage therethrough of a belt, there being a vertically disposed bore in said body member spaced forwardly of said slot, a pin including a main straight portion extending through said bore, and said pin further including an upper angularly arranged portion, the lower end of said pin being pointed, a plug connected to the upper end of said pin, a line extending from said plug for supporting fish, a float connected to the free end of said line, there being a cutout in said body member communicating with said bore, and a clamp having its lower portion widened and connected to said body member, the upper end of said clamp being shaped to define a downturned finger projecting through said cutout and engaging said pin.

2. In a fish stringer holder, a body member, there being a vertically disposed bore in said body member, a pin including a main straight portion extending through said bore, and said pin further including an upper angularly arranged portion, the lower end of said pin being pointed, a plug connected to the upper end of a said pin, a line extending from said plug for supporting fish, a float connected to the free end of said line, there being a cutout in said body member communicating with said bore, and a clamp having its lower portion widened and connected to said body member, the upper end of said clamp being shaped to define a downturned finger projecting through said cutout and engaging said pin.

3. A fish stringer holder comprising a body member provided with a horizontally disposed slot for the passage therethrough of a belt, there being a vertically disposed bore in said body member spaced forwardly of said slot, a pin including a main straight portion extending through said bore, said pin further including an upper angularly arranged portion for preventing the pin from moving all the way down through the body member and said angularly arranged portion defining a hand grip, the lower end of said pin being pointed for piercing the head of a fish, a plug connected to the upper end of said pin, a line extending from said plug for supporting fish, a float connected to the free end of said line, there being a knot in the end of the line for retaining the float on the line, there being a cutout in said body member communicating with the upper portion of said bore, and a clamp having its lower portion widened and connected to said body member whereby the upper portion of the clamp can flex outwardly slightly, the upper end of said clamp being shaped to define a downturned finger projecting through said cutout and engaging said pin, said finger frictionally engaging the pin for maintaining the pin in the body member.

References Cited in the file of this patent

UNITED STATES PATENTS

| | | |
|---|---|---|
| 2,220,633 | Albino | Nov. 5, 1940 |
| 2,455,766 | Harvey | Dec. 6, 1948 |
| 2,474,343 | Burder | June 28, 1949 |
| 2,518,541 | Griffin et al. | Aug. 15, 1950 |